United States Patent Office 3,203,944
Patented Aug. 31, 1965

3,203,944
METHOD OF TERMINATING BUTADIENE POLYMERIZATION
Henry L. Hsieh, Bartlesville, Okla., assignor to Phillips Petroleum Company, a corporation of Delaware
No Drawing. Filed July 9, 1962, Ser. No. 208,620
11 Claims. (Cl. 260—94.3)

This invention relates to catalyst-inactivating agents and their use in the termination of the polymerization of 1,3-butadiene. In another aspect, it relates to a method of reducing the tendency of polybutadiene to cold flow by the utilization of certain catalyst-inactivating agents. Still another aspect, the invention relates to the improved polybutadiene obtained when using the method of shortstopping the polymerization.

There has been conducted in recent years a great deal of research work directed toward the production of improved rubbery polymers. Great advances have been recently made in this field as a result of the discovery of new catalyst systems. These catalyst systems are often described as being "stereospecific" since they are capable of polymerizing monomers, particularly conjugated dienes, to a certain geometric configuration. One of the products which has attracted widespread attention because of its outstanding and superior properties is a polybutadiene containing a high percentage, e.g., at least 85 percent, of cis-1,4-addition. The physical properties of this high cis-polybutadiene are of such a nature that the polymer is particularly suitable for the fabrication of heavy duty tires and other articles for which conventional synthetic rubbers have heretofore been comparatively unsatisfactory. However, in the processing of high cis-polybutadiene, particularly in its packaging, shipping and storage, a certain amount of difficulty has been encountered because of the tendency of the polymer to cold flow when in the unvulcanized state. For example, if cracks or punctures develop in the package used in storing the polymer, the polymer will flow from the package with a resulting product loss or contamination and sticking together of stacked packages.

It is an object of this invention, therefore, to provide a method for terminating the polymerization reaction in which polybutadiene is produced so as to obtain a polymer product which has a reduced tendency to cold flow.

Another object of the invention is to provide a novel composition containing cis-polybutadiene which has a reduced tendency to cold flow when in the unvulcanized state.

A further object of the invention is to provide a method for inactivating a catalyst comprising an organometal compound and an iodine-containing component, which is employed in the polymerization of 1,3-butadiene.

Other and further objects and advantages of the invention will become apparent to those skilled in the art upon consideration of the accompanying disclosure.

The present invention is concerned with a method for inactivating the organometal-type catalyst employed in the polymerization of 1,3-butadiene. It has been discovered that the problem of cold flow in cis-polybutadiene can be substantially reduced by shortstopping the polymerization reaction with a compound selected from the group consisting of mono- and polyisocyanates and mono- and polyisothiocyanates. Rubbery polymers of cis-polybutadiene having Mooney values in the range of about 10 to 60 (ML–4 at 212° F.) can be readily obtained according to this method without serious problems in handling and processing.

When polymerizing 1,3-butadiene with an organometal-type catalyst, the reaction is usually terminated or shortstopped when the conversion has reached the desired level by the addition to the polymerization mixture of a catalyst-inactivating agent. Compounds which have been used to inactivate the catalyst include materials such as water, alcohols and rosin acids. These materials are effective shortstopping agents, but the product produced often has a tendency to cold flow when in the unvulcanized state. Accordingly, it was completely unexpected when it was found that mono- and polyisocyanates and mono- and polyisothiocyanates in addition to being effective shortstopping agents functioned to reduce the tendency of the polymer to cold flow. Furthermore, the valuable properties characteristic of cis-polybutadiene vulcanizates are retained by proceeding according to the present invention.

The shortstopping agents of this invention include compounds in which at least one of the groups —N=C=O and —N=C=S is present. The compounds can be conveniently represented by the general formulas R(NCO)$_m$ and R'(NCS)$_n$ wherein R and R' are aliphatic, cycloaliphatic or aromatic radicals containing, for example, from 2 to 30 carbon atoms and $m$ and $n$ are integers from 1 to 4. It is preferred that the R and R' radicals be hydrocarbon in character although the presence of unreactive groups containing elements other than carbon and hydrogen is permissible.

Specific examples of mono- and polyisocyanates and mono- and polyisothiocyanates include propane isocyanate, hexane-2-isocyanate, decane-1-isocyanate, cyclohexane isocyanate, benzene isocyanate, benzene-1,3-diisocyanate, benzene-1,4-diisocyanate, hexane-1,6-diisocyanate, toluene-2,4-diisocyanate, toluene-3,4-diisocyanate, diphenylmethane-4,4'-diisocyanate, naphthalene-1,5-diisocyanate, biphenyl 4,4'-diisocyanate, biphenyl-3,3'-dimethyl-4,4'-diisocyanate, biphenyl-3,3'-dimethoxy-4,4'-diisocyanate, 2,2'-diisocyanate diethyl ether, 3-(diethylamino)pentane-1, 5-diisocyanate, pentane-1,5-diisocyanate, butane-1,4-diisocyanate, octane-1,8-diisocyanate, ethane diisocyanate, propane-1,2-diisocyanate, cyclohex-4-ene-1,2-diisocyanate, benzene-1,2,4-triisocyanate, naphthalene-1,3,5,7-tetraisocyanate, triphenylmethane triisocyanate, naphthalene-1,3,7-triisocyanate, and the corresponding mono- and polyisothiocyanates, such as propane isothiocyanate, hexane-2-isothiocyanate, hexane-1,6-diisothiocyanate, and triphenylmethane triisothiocyanate. A preferred shortstopping agent is a polyaryl polyisocyanate having an average of three isocyanate groups per molecule and an average molecular weight of about 380. The general formula of this preferred compound is as follows:

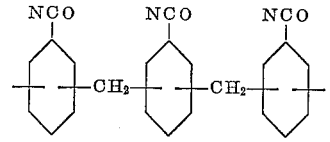

The shortstopping agents of this invention are broadly applicable to polymerization processes in which butadiene is polymerized with organometal-type catalysts. In a preferred embodiment, the mono- and polyisocyanates, and mono- and polyisothiocyanates are added to the polymerization mixture obtained by polymerizing butadiene with a catalyst system which includes an organometal compound and iodine, present either in the free or combined state. This polymerization system produces a cis-polybutadiene having outstanding properties when in the cured state but having a tendency to cold flow in the unvulcanized state. The term "cis-polybutadiene" as used herein, is intended to include a polybutadiene containing at least 85 percent cis 1,4-addition, e.g., from 85 to 98 percent or higher. These high cis-polybutadienes can be prepared by polymerizing 1,3-butadiene with any one of a large number of different stereospecific catalyst systems.

The shortstopping agents of this invention are preferably utilized to terminate the polymerization reaction in which 1,3-butadiene is polymerized with a catalyst selected from the group consisting of (1) a catalyst comprising an organometal compound having the formula $R_mM$, wherein R is alkyl, cycloalkyl, aryl, alkaryl, aralkyl, alkylcycloalkyl or cycloalkylalkyl M is aluminum, mercury, zinc, beryllium, cadmium or magnesium, and $m$ is equal to the valence of the metal M, and titanium tetraiodide, (2) a catalyst comprising an organometal compound having the formula $R_nM'$, wherein R is an organo radical as defined above, M' is aluminum, magnesium or lead, and $n$ is equal to the valence of the metal M', titanium tetrachloride and titanuim tetraiodide, (3) a catalyst comprising an organometal compound having the formula $R_aM''$, wherein R is an organo radical as defined above, M' is aluminum or magnesium and $a$ is equal to the valence of the metal M'', a compound having the formula $TiX_b$, wherein X is chlorine or bromine and $b$ is an integer from 2 to 4, inclusive, and elemental iodine, (4) a catalyst comprising an organometal compound having the formula $R_xM'''$, wherein R is an organo radical as defined above, M''' is aluminum, gallium, indium or thallium, and $x$ is equal to the valence of the metal M''', a titanium halide having the formula $TiX_4$, wherein X is chlorine or bromine, and an inorganic halide having the formula $M^{iv}I_c$, wherein $M^{iv}$ is beryllium, zinc, cadmium, aluminum, gallium, indium, thallium, silicon, germanium, tin, lead, phosphorus, antimony, arsenic and bismuth, and $c$ is an integer from 2 to 5, inclusive, and (5) a catalyst comprising an organo compound having the formula $R_xM'''$, wherein R$m$, M''' and $x$ are as defined above, titanium tetraiodide, and an inorganic halide having the formula $M^vX_d$, wherein $M^v$ is aluminum, gallium, indium, thallium, germanium, tin, lead, phosphorus, antimony, arsenic or bismuth, X is chlorine or bromine, and $d$ is an integer from 2 to 5, inclusive. The R radicals of the aforementioned formulas preferably contain up to and including 20 carbon atoms.

The following are examples of preferred catalyst systems which can be used to polymerize 1,3-butadiene to a cis 1,4-polybutadiene: triisobutylaluminum and titanium tetraiodide; triethylaluminum and titanium tetraiodide; triisobutylaluminum, titanium tetrachloride and titanium tetraiodide; triethylaluminum, titanium tetrachloride and titanium tetraiodide; diethylzinc and titanium tetraiodide; dibutylmercury and titanium tetraiodide; triisobutylaluminum, titanium tetrachloride and iodine; triethylaluminum, titanium tetrabromide and iodine; n-amylsodium and titanium tetraiodide; phenylsodium and titanium tetraiodide; n-butylpotassium and titanium tetraiodide; phenylpotassium and titanium tetraiodide; n-amylsodium, titanium tetrachloride and titanium tetraiodide; triphenylaluminum and titanium tetraiodide; triphenylaluminum, titanium tetraiodide and titanium tetrachloride; triphenylaluminum, titanium tetrachloride and iodine; tri-alpha-naphthylaluminum, titanium tetrachloride and iodine; tribenzylaluminum, titanium tetrabromide and iodine; diphenylzinc and titanium tetraiodide; di-2-tolylmercury and titanium tetraiodide; tricyclohexylaluminum, titanium tetrachloride and titanium tetraiodide; ethylcyclopentylzinc and titanium tetraiodide; tri(3-isobutylcyclohexy)aluminum and titanium tetraiodide; tetraethyllead, titanium tetrachloride and titanium tetraiodide; dimethylphenyllead, titanium tetrachloride and titanium tetraiodide; diphenylmagnesium and titanium tetraiodide; di-n-propylmagnesium, titanium tetrachloride and titanium tetraiodide; dimethylmagnesium, titanium tetrachloride and iodine; diphenylmagnesium, titanium tetrabromide and iodine; methylethylmagnesium, and titanium tetraiodide; dibutylberyllium and titanium tetraiodide; diethylcadmium and titanium tetraiodide; diisopropylcadmium and titanium tetraiodide; triisobutylaluminum, titanium tetrachloride, and antimony triiodide; triisobutylaluminum, titanium tetrachloride and aluminum triiodide; triisobutylaluminum, titanium tetrabromide, and aluminum triiodide; triethylaluminum, titanium tetrachloride, and phosphorus triiodide; tri-n-dodecylaluminum, titanium tetrachloride, and tin tetraiodide; triethylgallium, titanium tetrabromide, and aluminum triiodide; tri-n-butylaluminum, titanium tetrachloride, and antimony triiodide; tricyclopenttylaluminum, titanium tetarchloride, and silicon tetraiodide; triphenylaluminum, titanium tetrachloride, and gallium triiodide; triisobutylaluminum, titanium tetraiodide and tin tetrachloride; triisobutylaluminum, titanium tetraiodide and antimony trichloride; triisobutylaluminum, titanium tetraiodide and aluminum trichloride; triisobutylaluminum, titanium tetraiodide, and tin tetrabromide; triethylgallium, titanium tetraiodide, and aluminum tribromide; triethylaluminum, titanium tetraiodide, and arsenic trichloride; and tribenzylaluminum, titanium tetraiodide, and germanium tetrachloride.

The polymerization process for preparing cis-polybutadiene is carried out in the presence of a hydrocarbon diluent which is not deleterious to the catalyst system. Examples of suitable diluents include aromatic, paraffinic, and cycloparaffinic hydrocarbons, it being understood that mixtures of these materials can also be used. Specific examples of hydrocarbon diluents include benzene, toluene, n-butane, isobutane, n-pentane, isooctane, n-dodecane, cyclopentane, cyclohexane, methylcyclohexane, and the like. It is often preferred to employ aromatic hydrocarbons as the diluent.

The amount of the catalyst used in preparing the cis-polybutadiene porduct can vary over a rather wide range. The amount of the organometal used in the catalyst composition is usually in the range of 1.0 to 20 mols per mol of the halogen-containing component, i.e., a metal halide with or without a second metal halide or elemental iodine. However, a preferred mol ratio is from 2.5:1 to 12:1 of the organometal compound to the halogen-containing component. When using a catalyst comprising an organometal compound and more than one metal halide, e.g., titanium tetrachloride and titanium tetraiodide, titanium tetrachloride or tetrabromide and aluminum iodide, the mol ratio of the tetrachloride or tetrabromide to the iodide is usually in the range of 0.05:1 to 5:1. With a catalyst system comprising an organometal compound, a titanium chloride or bromide and elemental iodine, the mol ratio of titanium halide to iodine is generally in the range of 10:1 to 0.25:1, preferably 3:1 to 0.25:1. The concentration of the total catalyst compoistion, i.e., organometal and halogen-containing component, is usually in the range of 0.01 to 10 weight percent, preferably in the range of 0.01 to 5 weight percent, based on the total amount of 1,3-butadiene charged to the reactor system.

The process for preparing cis-polybutadiene can be carried out at temperatures varying over a rather wide range, e.g., from −100 to 250° F. It is usually preferred to operate at a temperature in the range of −30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction.

Various materials are known to be detrimental to the catalyst employed in preparing this cis-polybutadiene. These materials include carbon dioxide, oxygen and water. It is usually desirable, therefore, that the butadiene and diluent be free of these materials as well as other materials which may tend to inactivate the catalyst. Furthermore, it is desirable to remove air and moisture from the reaction vessel in which the polymerization is to be conducted.

Upon completion of the polymerization reaction, the reaction mixture is then treated to inactivate the catalyst and recover the rubbery polymer. In accordance with the present invention, the catalyst is inactivated by adding to the reaction mixture a mono- or polyisocyanate or a mono- or polyisothiocyanate. The amount of this shortstopping agent employed is usually in the range of 0.1 to 1 part by weight per 100 parts by weight of rubber. It is generally preferred to use an amount in the range of 0.15 to 0.70 part by weight per 100 parts by weight of rubber. After the shortstopping agent has been added, the polymer is then recovered by conventional methods such as steam stripping, alcohol coagulation or the like.

A more comprehensive understanding of the invention can be obtained by referring to the following illustrative examples, which are not intended, however, to be unduly limitative of the invention.

EXAMPLE I

Benzene isothiocyanate, benzene isocyanate, and toluene-2,4-diisocyanate were used as shortstopping agents in a series of runs in which butadiene was polymerized with a catalyst consisting of triisobutylaluminum, titanium tetrachloride, and elemental iodine. Control runs were also conducted in which similar reactions were shortstopped with isopropyl alcohol. The following recipe was employed in the polymerizations:

Recipe

| | |
|---|---|
| 1,3-butadiene, parts by weight | 100 |
| Toluene, parts by weight | 1100 |
| Triisobutylaluminum, m.h.m.[1] | 2.3 |
| Iodine, m.h.m.[1] | 0.68 |
| Titanium tetrachloride, m.h.m.[1] | 0.39 |
| Temperature, °F. | 41 |
| Time, hours | 16 |
| Conversion, percent | 100 |

[1] Millimoles per 100 parts monomer.

In conducting the runs, toluene was charged first to the reactor, after which it was purged with nitrogen. Butadiene was then added, followed by the triisobutylaluminum, elemental iodine and titanium tetrachloride in the order named. The runs were carried out in two series. One run in each series was shortstopped with isopropyl alcohol while the remaining runs were shortstopped with 0.2 part by weight per 100 parts of rubber of the aforementioned shortstopping agents. After shortstopping, the polymers were coagulated with isopropyl alcohol and separated. Thereafter, 0.5 part by weight per 100 parts of rubber of the antioxidant 2,2'-methylene-bis(4-methyl-6-tert-butylphenol) was incorporated into the wet polymer. The products were then dried. The results of the runs are shown hereinafter in Table I.

TABLE I

| Run No. | Shortstop | Inherent viscosity [1] | ML-4 at 212° F.[2] | Cold flow mg./min.[3] |
|---|---|---|---|---|
| 1 | Isopropyl alcohol | 2.25 | 35 | 4.4 |
| 2 | Benzene isothiocyanate | 2.31 | 41 | 2.8 |
| 3 | Isopropyl alcohol | 2.15 | 32 | 6.7 |
| 4 | Benzene isocyanate | 2.17 | 33 | 4.3 |
| 5 | Toluene-2,4-diisocyanate | 2.25 | 35 | 3.6 |

[1] One-tenth gram of polymer was placed in a wire cage made from 80 mesh screen and the cage was placed in 100 ml of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the of the relative viscosity by the weight of the original sample.
[2] ASTM D-297-55T.
[3] Cold flow was measured by extruding the rubber through a ¼-inch orifice at 3.5 p.s.i. pressure and a temperature of 50° C. (122° F). After allowing 10 minutes to reach steady state, the rate of extrusion was measured and the values reported in milligrams per minute.

The data in Table I show that a substantial reduction in cold flow was obtained by using the isocyanate-type shortstopping agents of this invention.

EXAMPLE II

Two runs were carried out in which butadiene was polymerized with a catalyst consisting of triisobutylaluminum, titanium tetrachloride and elemental iodine. The products obtained in these two runs had different Mooney values (ML-4 at 212° F.). The recipes employed in the runs were as follows:

RECIPES

| | 1 | 2 |
|---|---|---|
| 1,3-Butadiene, parts by weight | 100 | 100 |
| Toluene, parts by weight | 1100 | 1100 |
| Triisobutylaluminum, m.h.m. | 2.5 | 2.8 |
| Iodine, m.h.m. | 0.73 | 0.81 |
| Titanium tetrachloride, m.h.m. | 0.41 | 0.467 |
| Temperature, °F. | 41 | 41 |
| Time, hours | 16 | 16 |
| Conversion, percent | 100 | 100 |

The procedure employed in the polymerizations was the same as that described in Example I except that 0.55 part by weight per 100 parts of rubber of a polyaryl polyisocyanate (PAPI-1, a product of Carwin Chemical Company) was used as the shortstopping agent.

The above-described polymers and a commercial cis-polybutadiene, prepared with the same type of catalyst system and shortstopped with rosin acid, were evaluated in a treated stock recipe. The stocks were mixed in a midget Banbury at 250° F. and 45 r.p.m. in an 8-minute cycle with the aromatic oil (Philrich 5) being added at two minutes. All other materials except the curatives were added at zero time. The sulfur and NOBS Special were added on the roll mill. Raw polymer properties, data on compounded stocks, and physical properties of the vulcanizates were obtained. The results of the tests are summarized below in Table II.

TABLE II

| | Polymer Shortstopped With | | |
|---|---|---|---|
| | PAPI-1 | | Rosin acid control |
| | 1 | 2 | |
| COMPOUNDING RECIPES, PARTS BY WEIGHT | | | |
| Polymer | 100 | 100 | 100 |
| High abrasion furnace black | 50 | 50 | 50 |
| Zinc oxide | 3 | 3 | 3 |
| Stearic acid | 1 | 1 | 1 |
| Flexamine [1] | 1 | 1 | 1 |
| Resin 731D [2] | 5 | 5 | 5 |
| Philrich 5 [3] | 5 | 5 | 5 |
| Sulfur | 1.75 | 1.75 | 1.75 |
| NOBS Special [4] | 1.05 | 1.05 | 1.05 |
| RAW POLYMER PROPERTIES | | | |
| Inherent viscosity [5] | 2.74 | 2.32 | 2.54 |
| Gel, percent [6] | 0 | 0 | 0 |
| ML-4 at 212° F.[7] | 56.0 | 38.0 | 46.5 |
| Cold flow, mg./min.[8] | 0.9 | 1.3 | 3.6 |
| COMPOUNDED STOCKS | | | |
| MS-1½ at 212° F.[7] | 48.7 | 38.8 | 50.0 |
| Scorch at 280° F., min.[9] | 18.1 | 18.8 | 13.6 |
| Extrusion at 250° F.:[10] | | | |
| Inches/min | 39.8 | 42.0 | 41.2 |
| Grams/min | 101.5 | 108.8 | 102 |
| Rating (Garvey die) | 7+ | 11+ | 7 |
| PHYSICAL PROPERTIES, CURED 30 MINUTES AT 307° F. | | | |
| $\nu \times 10^4$, moles/cc.[11] | 2.22 | 2.11 | 2.11 |
| 300% modulus, p.s.i.[12] | 1,425 | 1,400 | 1,375 |
| Tensile, p.s.i.[12] | 2,570 | 2,390 | 2,600 |
| Elongation, percent [12] | 440 | 430 | 460 |
| 200° F. max. tensile, p.s.i.[12] | 1,545 | 1,350 | 1,145 |
| Heat build-up, $\Delta T$, °F.[13] | 41.2 | 43.9 | 43.3 |
| Resilience, percent [14] | 77.5 | 76.0 | 76.8 |
| Shore A hardness [15] | 62.0 | 63.0 | 62.5 |

See footnotes at end of tables.

TABLE II—Continued

| | Polymer Shortstopped With | | |
|---|---|---|---|
| | PAPI-1 | | Rosin acid control |
| | 1 | 2 | |
| OVEN AGED 24 HOURS AT 212° F. | | | |
| 200% Modulus, p.s.i.[12] | 1,380 | 1,375 | 1,300 |
| Tensile, p.s.i.[12] | 1,800 | 1,800 | 1,775 |
| Elongation, percent [12] | 255 | 235 | 245 |
| Heat build-up, Δ T, ° F.[13] | 31.0 | 34.4 | 35.8 |
| Resilience, percent [14] | 83.2 | 83.1 | 82.8 |

[1] Physical mixture containing 65 percent of a complex diarylamine ketone reaction product and 35 percent of N,N'-diphenyl-p-phenylenediamine.
[2] Disproportionated pale rosin stable to heat and light.
[3] Aromatic oil.
[4] N-oxydiethylene-2-benzothiazyl sulfenamide.
[5] See Footnote 1 of Table I.
[6] See Footnote 2 of Table I.
[7] ASTM D-297-55T.
[8] See Footnote 3 of Table I.
[9] ASTM D 1077-55T, Mooney Viscometer, large rotor, Scorch in minutes to 5 point rise above minimum Mooney.
[10] No. ½ Royle Extruder with Garvey die. See Ind. Eng. Chem. 34, 1309 (1942). As regards the "rating" figure, 12 designates an extruded product considered to be perfectly formed whereas lower numerals indicate less perfect products.
[11] Determined by the swelling method of Kraus as given in Rubber World, October 1946. This value is the number of effective network chains per unit volume of rubber. The higher the number, the more the rubber is crosslinked (vulcanized).
[12] ASTM D412-51T. Scott Tensile Machine L-6. Tests made at 80° F.
[13] ASTM D623-52T. Method A, Goodrich Flexometer, 143 lbs./sq. in. load, 0.175 inch stroke. Test specimen is a right circular cylinder, 0.7 inch in diameter and 1 inch high.
[14] ASTM D945-55 (modified). Yerzley oscillograph. Test specimen is a right circular cylinder, 0.7 inch in diameter and 1 inch high.
[15] ASTM D676-55T. Shore Durometer, Type A.

The polyisocyanate-terminated polymers had a longer scorch time than the control and both had a better extrusion appearance, with the 38-Mooney polymer being superior. The polyisocyanate-terminated polymers were similar to the control in processability and physical properties.

As will be evident to those skilled in the art, many variations and modifications of the invention can be practiced in view of the foregoing discosure. Such variations and modifications are believed to come within the spirit and scope of the invention.

I claim:
1. In a process for polymerizing 1,3-butadiene in the presence of a catalyst system selected from the group consisting of (1) a catalyst comprising an organometal compound having the formula $R_mM$, wherein R is alkyl, cycloalkyl, aryl, alkaryl, aralkyl, alkylcycloalkyl or cycloalkylalkyl containing up to 20 carbon atoms, M is aluminum, mercury, zinc, beryllium, cadmium or magnesium, and m is equal to the valence of the metal M, and titanium tetraiodide, (2) a catalyst comprising an organometal compound having the formula $R_nM'$, wherein R is an organo radical as defined above, M' is aluminum, magnesium or lead, and n is equal to the valence of the metal M', titanium tetrachloride and titanium tetraiodide, (3) a catalyst comprising an organometal compound having the formula $R_aM''$, wherein R is an organo radical as defined above, M'' is aluminum or magnesium and a is equal to the valence of the metal M'', a compound having the formula $TiX_b$, wherein X is chlorine or bromine and b is an integer from 2 to 4, inclusive, and elemental iodine, (4) a catalyst comprising an organometal compound having the formula $R_xM'''$, wherein R is an organo radical as defined above, M''' is aluminum, gallium, indium or thallium, and x is equal to the valence of the metal M''', a titanium halide having the formula $TiX_4$, wherein X is chlorine or bromine, and an inorganic halide having the formula $M^{iv}I_c$, wherein $M^{iv}$ is beryllium, zinc, cadmium, aluminum, gallium, indium, thallium, silicon, germanium, tin, lead, phosphorus, antimony, arsenic, and bismuth, and c is an integer from 2 to 5, inclusive, and (5) a catalyst comprising an organo compound having the formula $R_xM'''$, wherein R, M''' and x are as defined above, titanium tetraiodide, and an inorganic halide having the formula $M^vX_d$, wherein $M^v$ is aluminum, gallium, indium, thallium, germanium, tin, lead, phosphorus, antimony, arsenic or bismuth, X is chlorine or bromine, and d is an integer from 2 to 5, inclusive, the improvement which comprises adding to the polymerization mixture a shortstopping agent selected from the group consisting of mono- and polyisocyanates and mono- and polyisothiocyanates of the formula $R(NCO)_m$ and $R'(NCS)_n$ where R and R' are selected from the group consisting of aliphatic, cycloaliphatic, and aromatic radicals of 2 to 30 carbon atoms, and m and n are integers from 1 to 4.

2. In a polymerization process in which 1,3-butadiene is polymerized with an iodine-containing catalyst selected from the group consisting of (1) a catalyst comprising an organometal compound having the formula $R_mM$, wherein R is alkyl, cycloalkyl, aryl, alkaryl, aralkyl, alkylcycloalkyl or cycloalkyalkyl containing up to 20 carbon atoms, M is aluminum, mercury, zinc, beryllium, cadmium or magnesium, and m is equal to the valence of the metal M, and titanium tetraiodide, (2) a catalyst comprising an organometal compound having the formula $R_nM'$, wherein R is an organo radical as defined above, M' is aluminum, magnesium or lead, and n is equal to the valence of the metal M', titanium tetrachloride and titanium tetraiodide, (3) a catalyst comprising an organometal compound having the formula $R_aM''$, wherein R is an organo radical as defined above, M'' is aluminum or magnesium and a is equal to the valence of the metal M'', a compound having the formula $TiX_b$, wherein X is chlorine or bromine and b is an integer from 2 to 4, inclusive, and elemental iodine, (4) a catalyst comprising an organometal compound having the formula $R_xM'''$, wherein R is an organo radical as defined above, M''' is aluminum, gallium, indium or thallium, and x is equal to the valence of the metal M''', a titanium halide having the formula $TiX_4$, wherein X is chlorine or bromine, and an inorganic halide having the formula $M^{iv}I_c$, where $M^{iv}$ is beryllium, zinc, cadmium, aluminum, gallium, indium, thallium, silicon, germanium, tin, lead, phosphorus, antimony, arsenic, and bismuth, and c is an integer from 2 to 5, inclusive, and (5) a catalyst comprising an organo compound having the formula $R_xM'''$, wherein R, M''' and x are as defined above, titanium tetraiodide, and an inorganic halide having the formula $M^vX_d$, wherein $M^v$ is aluminum, gallium, indium, thallium, germanium, tin, lead, phosphorus, antimony, arsenic or bismuth X is chlorine or bromine, and d is an integer from 2 to 5, inclusive, the improvement which comprises the shortstopping the polymerization by adding to the polymerization mixture a compound selected from the group consisting of mono- and polyisocyanates and mono- and polyisothiocyanates of the formula $R(NCO)_m$ and $R'(NCS)_n$ where R and R' are selected from the group consisting of aliphatic, cycloaliphatic, and aromatic radicals of 2 to 30 carbon atoms, and m and n are integers from 1 to 4, the amount of said compound being in the range of 0.1 to 1 part by weight per 100 parts by weight of polymer.

3. The method of claim 2 in which said compound is benzene isocyanate.

4. The method of claim 2 in which said compound is benzene isothiocyanate.

5. The method of claim 2 in which said compound is toluene-2,4-diisocyanate.

6. The method of claim 2 in which said compound is a polyaryl polyisocyanate.

7. The method of claim 2 in which said compound is hexane-1,6-diisocyanate.

8. A method for producing a cis-polybutadiene which comprises short-stopping the polymerization of 1,3-butadiene in the presence of an iodine-containing catalyst system selected from the group consisting of (1) a catalyst comprising an organometal compound having the formula $R_mM$, wherein R is alkyl, cycloalkyl, aryl, alkaryl, aralkyl, alkylcycloalkyl or cycloalkylalkyl containing up to 20 carbon atoms, M is aluminum, mercury, zinc, beryllium, cadmium or magnesium, and $m$ is equal to the valence of the metal M, and titanium tetraiodide, (2) a catalyst comprising an organometal compound having the formula $R_nM'$, wherein R is an organo radical as defined above, M' is aluminum, magnesium or lead, and $n$ is equal to the valence of the metal M', titanium tetrachloride and titanium tetraiodide, (3) a catalyst comprising an organometal compound having the formula $R_aM''$, wherein R is an organo radical as defined above, M'' is aluminum or magnesium and $a$ is equal to the valence of the metal M'', a compound having the formula $TiX_b$, wherein X is chlorine or bromine and $b$ is an integer from 2 to 4, inclusive, and elemental iodine, (4) a catalyst comprising an organometal compound having the formula $R_xM'''$, wherein R is an organo radical as defined above, M''' is aluminum, gallium, indium or thallium, and $x$ is equal to the valence of the metal M''', a titanium halide having the formula $TiX_4$, wherein X is chlorine or bromine, and an inorganic halide having the formula $M^{iv}I_c$, wherein $M^{iv}$ is beryllium, zinc, cadmium, aluminum, gallium, indium, thallium, silicon, germanium, tin, lead, phosphorus, antimony, arsenic, and bismuth, and $c$ is an integer from 2 to 5, inclusive, and (5) a catalyst comprising an organo compound having the formula $R_xM'''$, wherein R, M''' and $x$ are as defined above, titanium tetraiodine, and an inorganic halide having the formula $M^vX_d$, wherein $M^v$ is aluminum, gallium, indium, thallium, germanium, tin, lead, phosphorus, antimony, arsenic or bismuth, X is chlorine or bromine, and $d$ is an integer from 2 to 5, inclusive, by adding to the polymerization mixture a compound selected from the group consisting of mono- and polyisocyanates and mono- and polyisothiocyanates of the formula $R(NCO)_m$ and $R'(NCS)_n$ where R and R' are selected from the group consisting of aliphatic, cycloaliphatic, and aromatic radicals of 2 to 30 carbon atoms, and $m$ and $n$ are integers from 1 to 4, the amount of said compound being in the range of 0.15 to 0.70 part by weight per 100 parts by weight of cis-polybutadiene; and recovering said cis-polybutadiene from said polymerization mixture.

9. The method of claim 8 in which said catalyst system comprises the product obtained by mixing a trialkylaluminum, titanium tetrachloride and iodine.

10. The method of claim 8 in which said catalyst system comprises the product obtained by mixing a trialkylaluminum and titanium tetraiodide.

11. The method of claim 8 in which said catalyst system comprises the product obtained by mixing a trialkylaluminum, titanium tetrachloride and titanium tetraiodide.

References Cited by the Examiner
UNITED STATES PATENTS
3,076,795   2/63   Hall _____ 260—94.7
FOREIGN PATENTS
1,215,953   11/59   France.

JOSEPH L. SCHOFER, *Primary Examiner.*